(No Model.)
J. H. FLAGLER.
DEVICE FOR WELDING TUBING.
No. 371,834. Patented Oct. 18, 1887.
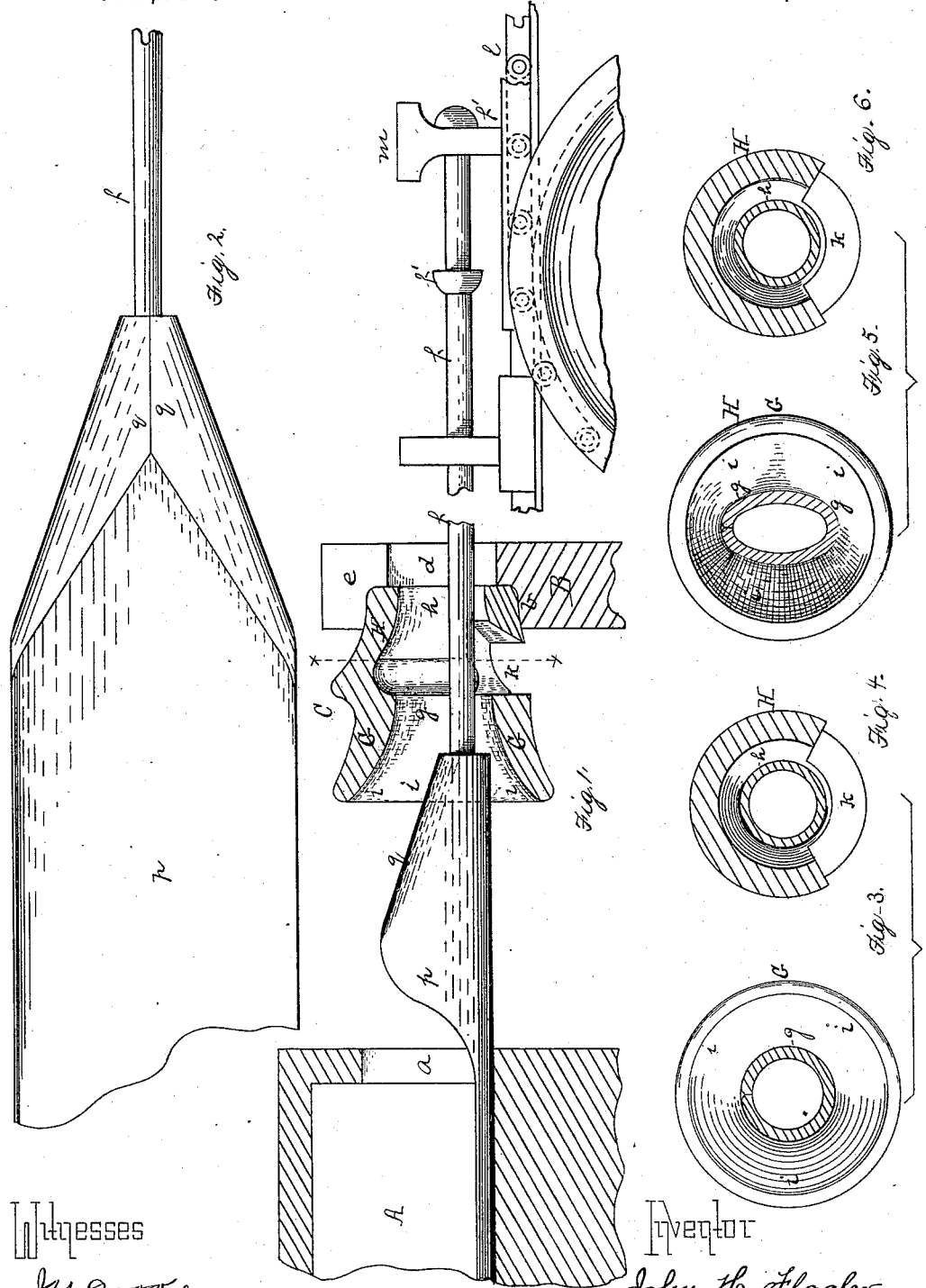
Witnesses
Ju Cooke
A. M. Imbrie.
Inventor
John H. Flagler
by James L. Kay
Attorney

UNITED STATES PATENT OFFICE.

JOHN H. FLAGLER, OF NEW YORK, N. Y.

DEVICE FOR WELDING TUBING.

SPECIFICATION forming part of Letters Patent No. 371,834, dated October 18, 1887.

Application filed March 8, 1883. Serial No. 87,421. (No model.)

*To all whom it may concern:*

Be it known that I, JOHN H. FLAGLER, of New York, in the county of New York and State of New York, have invented a new and useful Improvement in Apparatus for Welding Tubing, (Case B;) and I do hereby declare the following to be a full, clear, and exact description thereof.

My invention relates to apparatus for forming butt-weld wrought-metal tubing in dies. The usual method of forming this tubing is to weld a rod onto the plate from which the tube is formed and turn the forward ends of the plate over and weld them onto the rod. The plate thus formed is heated to a welding heat and drawn by means of this rod through a bell-shaped die, commonly termed a "bell," and the plate is turned over into tubular form by the flaring mouth of the die, while the edges are butted and welded in the welding-passage of the bell. The tube thus formed is generally reheated one or more times and drawn through one or more dies having smaller passages to form a more perfect weld and size and compact the metal and so improve its quality by working and reducing it. Though the subsequent reducing of the tubing improves its quality, the frequent reheatings necessarily detract from the quality of the metal and waste it, oxidizing or "scaling" it, so that the plate for forming an ordinary inch tube is made slightly wider for each reheating to which the tube is subjected. In some cases a bell having two or more contracted portions therein has been employed, the tube being by this means both welded and reduced at one operation, and my invention relates to this class of bells, its object being to prevent the caving in of the tubing as it passes from the welding to the reducing-bell.

It consists, essentially, in combining with a tapering welding-bell having an oblong or oval welding-passage one or more reducing-bells having circular passages.

To enable others skilled in the art to make and use my invention, I will describe its construction and manner of use, referring for that purpose to the accompanying drawings, forming part of this specification, in which—

Figure 1 is a longitudinal section of a welding-furnace and my improved welding apparatus, showing in full lines a plate drawn from the furnace and ready to be drawn through the welding apparatus. Fig. 2 is a top view of the plate ready to be drawn into tubing. Figs. 3 and 4 are a face view and a cross-section on the line $x\ x$, Fig. 1, respectively, illustrating the bells where the welding-bell has a circular passage, and showing sections of tubing in each bell; and Figs. 5 and 6 are like views where the welding-bell has an oblong or oval welding-passage.

Like letters of reference indicate like parts in each.

In the drawings, A is the usual welding-furnace, having the port $a$.

B is the drawing frame or support in which the combined drawing-bell C is held during the operation of drawing. This support B has a seat, $b$, for the bell, and a hole, $d$, through which the tube passes after being drawn through the bell. At the top of the hole $d$ is the slot $e$, through which the drawing-rod $f$ passes when the bell is brought to place in the support B.

My improved tube-welding apparatus may be formed of separate bells supported in different frames in line with each other, if so desired. I prefer, however, to cast the bells in a single piece, so that the combined bells may be used in substantially the same manner as the ordinary single bell, and have so illustrated it in the drawings.

The combined bell C shown is formed of the welding-bell G, having the welding-passage $g$, and the reducing-bell H, having the reducing passage or opening $h$. The mouth $i$ of the welding-bell G is flaring, so that when the plate to be welded into tubing is drawn into it the curved or flaring sides of the bell will turn up the sides of the plate into substantially tubulate form, bringing the edges together ready to be butted and welded into tubing in the welding-passage $g$ of the bell. The welding-passage $g$ is formed oval, as shown in Fig. 5, for the reason that the oval or egg shaped tube formed in the welding-bell, as it passes from the bell with the welded edges above and supported by the sides of the tube which are nearly perpendicular, is not liable to cave or fall in, in case the metal is too highly heated—a difficulty experienced where the tube is first welded into a circular shape in cross-section, as the sides of the tube do not give the same support to the top, and if it falls but slightly it is liable in the next die to be bent in farther and born an imperfect tube.

The reducing-bell H is formed with slightly-flaring sides, thus leaving a space entirely around the tube after it is drawn through the welding-bell, and the reducing-passage $h$ of the bell is circular and slightly smaller than the welding-passage $g$, the two passages differing in size according to the required reduction of the metal in the second bell, H, according to the size of the tubing.

In the reducing-bell H is the opening $k$ for the escape of scale which may drop from the pipe after it is drawn through the welding-passage and before it enters the reducing-passage, this scale thus being prevented from pressing into and marring the tubing.

If desired, one or more bells of substantially the same construction as the reducing-bell H, and having reducing-passages slightly smaller, may be formed back of the bell H, the tube being drawn through the three or more bells at one time.

Back of the drawing-frame is the endless chain $l$, mounted in a suitable frame and having a suitable buggy, $m$, in which the rod $f$ is caught to draw the tubing through the combined dies. The buggy shown has a slot within which the rod $f$ fits and against which annular shoulders $f'$ on the rod catch.

In forming butt-weld tubing by my improved apparatus the forward edges, $q$, of the plate $p$ are cut off and the drawing-rod $f$ is welded thereto, the forward edges of the plate being turned over and welded to the rod, as shown in Fig. 2. The plate is then brought to a welding heat in the furnace, and when ready to be operated upon the combined bell C is slipped over the rod $f$, the rod dropped through the slot $e$, and the bell brought to place in the seat $b$. The rod is then dropped into the buggy $m$ and the endless chain set in motion, and the plate is thus drawn through the bells and formed into tubing. As the plate is drawn into the welding-bell G, its flaring sides $i$ turn up the sides of the plate into substantially tubular form, and the edges of the plate are butted and welded in the welding-passage $g$ of the bell, a tube being formed substantially the same as that shown in cross-section in Fig. 5, being thus welded into an oblong or oval tube, and in case the metal is too highly heated and has a tendency to sag or fall down the sides of the tube support the upper part and prevent it sinking to such an extent as to cave in and form an imperfect tube, as would happen if the tube were welded in a circular bell, as shown in Fig. 3. As the tubing is drawn through the combined bell, it is next drawn into the reducing-bell H, and any scale thrown off into the enlarged portion of the bell falls through the opening $k$ at the base of the bell. As it passes through the reducing-passage $h$, it is brought to proper circular shape, more perfectly welded and compacted, and its outer surface sized and finished by the reduction therein, and, where but one reduction is necessary, is formed into the finished tube, as shown in cross-section in Figs. 4 and 6. If it is desired to reduce it still further, a combined bell having three or more passages, as above described, may be employed, or the tube reheated and again drawn, as above described, the operation requiring fewer manipulations than the ordinary method.

What I claim as my invention, and desire to secure by Letters Patent, is—

In apparatus for welding and reducing butt-weld tubing, the combination of a tapering welding-bell, having an oblong or oval welding-passage, and one or more reducing-bells in line therewith, having circular passages, substantially as and for the purposes set forth.

In testimony whereof I, the said JOHN H. FLAGLER, have hereunto set my hand.

JOHN H. FLAGLER.

Witnesses:
   JAMES I. KAY,
   J. N. COOKE.